United States Patent [19]

Kokta

[11] Patent Number: 4,587,035

[45] Date of Patent: May 6, 1986

[54] PROCESS FOR ENHANCING TI:AL$_2$O$_3$ TUNABLE LASER CRYSTAL FLUORESCENCE BY ANNEALING

[75] Inventor: Milan R. Kokta, Washougal, Wash.

[73] Assignee: Union Carbide Corporation, Danbury, Conn.

[21] Appl. No.: 736,244

[22] Filed: May 20, 1985

[51] Int. Cl.$^4$ ............................................. C09K 11/36
[52] U.S. Cl. ........................... 252/301.4 F; 29/576 T; 148/DIG. 3; 156/DIG. 73; 252/301.4 R
[58] Field of Search ................. 252/301.4 F, 301.4 R; 156/DIG. 73; 29/576 T; 148/DIG. 3

[56] References Cited

U.S. PATENT DOCUMENTS 4,416,723 11/1983 Pelts et al. .................. 156/DIG. 73

FOREIGN PATENT DOCUMENTS 595445 12/1947 United Kingdom ....... 156/DIG. 73

OTHER PUBLICATIONS

"New Developments in Solid-State Lasers"—Peter F. Moulton; Laser Focus, May 1983, pp. 83–86.

*Primary Examiner*—Jack Cooper
*Attorney, Agent, or Firm*—F. J. McCarthy

[57] ABSTRACT

Annealing process for titanium doped sapphire tunable laser material to enhance lasing efficiency. The process comprises (I) heating the material in a vacuum of at least $1 \times 10^{-6}$ torr at a temperature in the range of about 1850° to 2,000° C. for at least 48 hours and (II) cooling the material from its temperature in said range to 1500° C. at a rate not exceeding 2° C. per minute.

1 Claim, 2 Drawing Figures

PROCESS FOR ENHANCING TI:AL₂O₃ TUNABLE LASER CRYSTAL FLUORESCENCE BY ANNEALING

The present invention relates generally to the field of lasers. More particularly the present invention is related to a process for improving the lasing efficiency of tunable titanium doped sapphire, $Ti:Al_2O_3$.

Tunable solid state laser materials have been known to the art since the early 1960's and $Ti:Al_2O_3$ was disclosed by P. F. Moulton (Laser Focus, May 1983) as a tuneable laser material having an effective fluorescence tuning range of 750 to 900 nm. The absorption spectra range for $Ti:Al_2O_3$ has been given as extending up to about 650 nm; however, it has been discovered that unless special precautions are taken in the course of processing titanium doped sapphire, $Ti:Al_2O_3$, the absorption spectra, while reaching a minimum valve at about 650 nm, extends over the entire lasing (fluorescence) range with the undesirable result that lasing efficiency of the tunable $Ti:Al_2O_3$ material is significantly reduced.

Accordingly, it is an object of the present invention to provide a new process for improving the lasing efficiency of tunable titanium doped sapphire lasing material.

Figure 1:
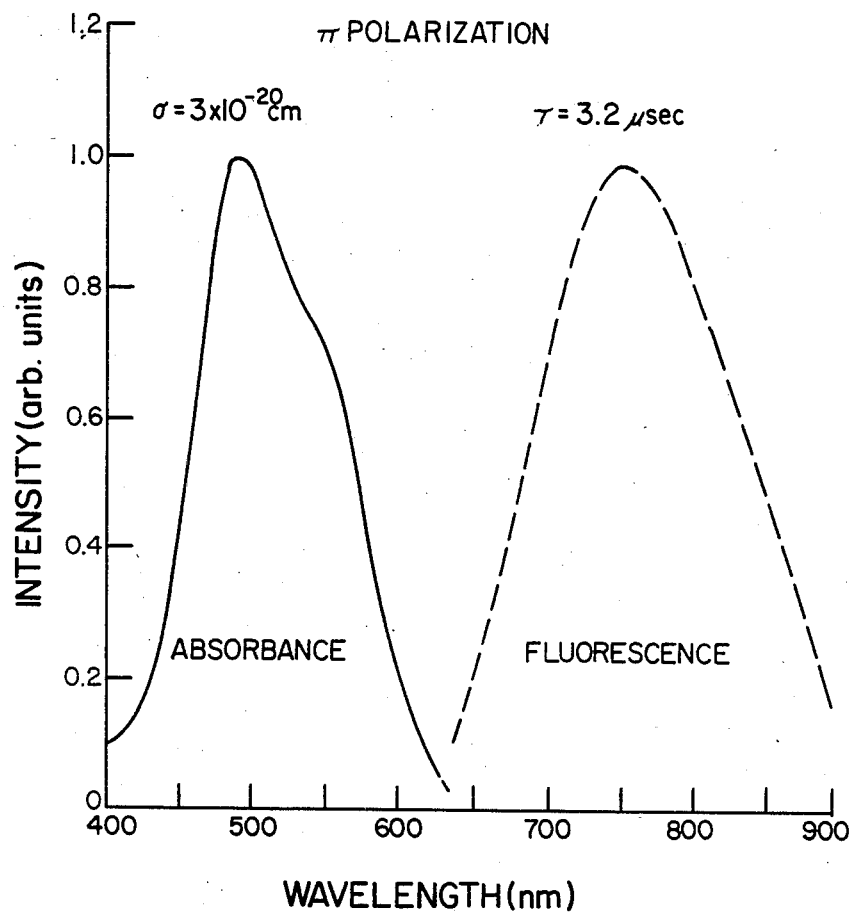
Figure 2:
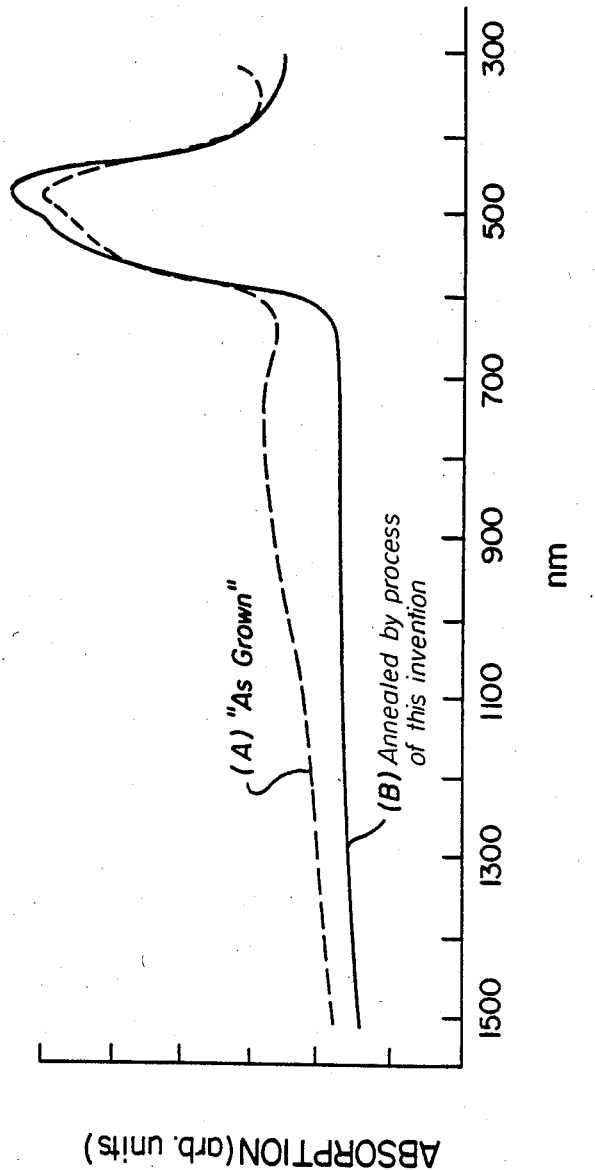

Other objects will be apparent from the following description and claims taken in conjunction the drawings wherein FIG. 1 shows a prior art illustration of absorption and fluorescence spectra for $Ti:Al_2O_3$ and FIG. 2 shows representative absorption spectra for $Ti:Al_2O_3$ processed by the post crystal growth annealing technique of the present invention in comparison with absorption spectra for $Ti:Al_2O_3$ which has not been subjected to the post crystal growth annealing technique of the present invention.

In the practice of the present invention, a crystal of titanium doped sapphire ($Al_2O_3$) containing from about 0.03 to 1.0 atomic percent of titanium is prepared by melting in a crucible (e.g., made of iridium) a mixture of high purity $Al_2O_3$, e.g., sapphire "crackle" containing less than 100 ppm of impurities, such as Si, Cr, Fe, Mg with high purity $TiO_2$ (less than 50 ppm Cr, Si, Fe, Ca). The melting is conducted under an atmosphere of non-reactive gas, e.g., nitrogen containing less than 10 ppm $O_2$. The melt is maintained at a temperature of 2050° to 2080° C. and a seed crystal of alumina is used to "pull" a boule of $Ti:Al_2O_3$ from the melt using the well known Czochralski technique. The boule of $Ti:Al_2O_3$ thus prepared, at this stage, contains a large number of scattering centers (i.e., bubbles, inclusions, and point defects), is of marginal clarity, its color is a purple-blue hue and its absorption spectra is represented by dotted lines (A) for the "as grown" boule illustrated in FIG. 2. As can be seen, the absorption spectra for the "as grown" boule extends completely across the wave length of the fluorescence spectra in the prior art diagram of FIG. 1 and, consequently, the lasing efficiency over the tunable spectra of the Ti doped sapphire material is diminished. In order to essentially eliminate absorption in the tunable spectra of 750 to 950 nm, and in accordance with the present invention, the Ti doped sapphire crystal is annealed at a temperature in the range of 1850° C. to 2000° C. in a high vacuum of at least $1 \times 10^{-6}$ torr for at least 48 hours (the length of the annealing period is increased with increased cross-section above about ⅛ inch of the crystal. Following the annealing period, the temperature of the boule is lowered to about 1500° C. at a rate of not more than about 2° C. per minute, preferably not more than about 1° C. per minute and not less than about 0.25° C. per minute. At temperatures from 1500° C. to room temperature the cooling rate is not critical. The resulting annealed and cooled Ti doped sapphire boule will show a representative absorption spectra illustrated by the solid line (B) in FIG. 2 which indicates essentially no absorption spectra at wave lengths above 650 nm. As a result, the lasing efficiency for the material of (B) is on the average from 2 to 28% more than that of (A) and the material of (B) shows by EPR (electron paramagnetic resonance) analysis an increased $Ti^{+3}$ content as compared to (A) and a lower number of scattering centers (i.e., $TiO_2$ inclusions, point defects); as compared to (A) and has more clarity and its color is deep pink.

The following example will further illustrate the presen invention.

EXAMPLE

A charge was prepared from $TiO_2$ powder and $Al_2O_3$ "crackle". The impurity content of the above materials was determined to be $Al_2O_3$: less than 100 ppm impurities
$TiO_2$: less than 50 ppm impurities A charge was prepared as follows:

$TiO_2$: 22 grams
$Al_2O_3$: 4000 grams

The materials were charged to an iridium crucible located in a "bell jar" which was sealed against atmospheric leaks. A flow (40 CFM) of nitrogen with less than 10 ppm $O_2$ was used as the ambient atmosphere within the "bell jar". An induction coil was used to heat the charge over a period of 8 hours from room temperature to a temperature in the range of 2050° C.–2080° C. which was maintained for 2 hours at which time the charge was melted. A sapphire ($Al_2O_3$) seed crystal mounted on a rotable rod was lowered into the melt, rotated at 15 rpm and raised over a period of 500 hours to obtain a boule of $Ti:Al_2O_3$ crystal 1½ inch diameter and 8 inches length. A laser rod, ¼ inch diameter, 3 inches n length, was manufactured from the boule. The boule was analyzed by EPR and absorption techniques and was found to have a $Ti^{3+}$ content of 0.06 atomic percent and detectable scattering centers and low clarity due to inclusions. The boule was of purple-blue hue and its absorption spectra corresponded to (A) of FIG. 2.

The boule was subsequently annealed at a temperature of 1916° C. for 48 hours and then cooled to 1500° C. at a rate of 0.9° C./minute. The boule was analyzed and found to have a $Ti^{3+}$ content of 0.08 and was purple in color and scattering centers were not detected. The absorption spectra corresponded to (B) of FIG. 2 and its lasing efficiency increased as a result of the annealing treatment.

What is claimed is:

1. A process for minimizing the absorption of $Ti:Al_2O_3$ crystal material in the range of 750 to 950 nm which comprises (i) heating the crystal material in a vacuum of at least $1 \times 10^{-6}$ torr at a temperature in the range of about 1850° to 2000° C. for at least 48 hours (ii) cooling the material from its temperature in said range to 1500° C. at a rate not exceeding 2° C. per minute, the cooled material exhibiting a higher lasing efficiency than the $Ti:Al_2O_3$ crystal material prior to said heating and cooling.

* * * * *